(12) United States Patent
Sarno

(10) Patent No.: US 6,886,808 B2
(45) Date of Patent: May 3, 2005

(54) AXIALLY ACTUATED DRAIN VALVE FOR POOLS AND SPAS

(75) Inventor: John Sarno, Newhall, CA (US)

(73) Assignee: Magic Plastics, Inc., Valencia, CA (US)

(*) Notice: Subject to any disclaimer, the term of this patent is extended or adjusted under 35 U.S.C. 154(b) by 45 days.

(21) Appl. No.: 10/618,872

(22) Filed: Jul. 14, 2003

(65) Prior Publication Data

US 2005/0012067 A1 Jan. 20, 2005

(51) Int. Cl.$^7$ .............................................. F16K 31/00
(52) U.S. Cl. ....................... 251/353; 251/319; 251/339
(58) Field of Search ................................. 251/318, 319, 251/324, 325, 333, 339, 349, 353

(56) References Cited

U.S. PATENT DOCUMENTS

| | | | | |
|---|---|---|---|---|
| 3,771,177 A | * | 11/1973 | Rogers et al. ................. 4/287 |
| 3,817,267 A | * | 6/1974 | Hicks et al. ................. 137/204 |
| 4,801,124 A | * | 1/1989 | Liebel ....................... 251/149.4 |
| 4,876,749 A | * | 10/1989 | Antoniello ...................... 4/295 |
| 5,096,158 A | * | 3/1992 | Burdick et al. ............. 251/144 |
| 5,154,138 A | * | 10/1992 | Siddiqui et al. ........... 119/72.5 |
| 5,433,410 A | * | 7/1995 | Foltz ........................... 251/100 |
| 5,546,986 A | * | 8/1996 | Clark et al. ............ 137/614.05 |
| 6,219,861 B1 | * | 4/2001 | Chen .............................. 4/689 |

* cited by examiner

*Primary Examiner*—J. Casimer Jacyna
(74) *Attorney, Agent, or Firm*—Donald D. Mon

(57) ABSTRACT

An axially actuated drain valve for pools and spas mountable in a wall thereof. It includes a tubular body and a coaxial plunger. The body opens into the spa or pool at an inner end. The plunger has a passage opening near the outer end of its passage. A cylindrical seal engages with a seal on the plunger for a substantial range of movement to keep the valve closed. Beyond that, the plunger passage is opened for flow from the body passage opening. The plunger may have threads on its outer end to be coupled to a hose fitting.

9 Claims, 2 Drawing Sheets

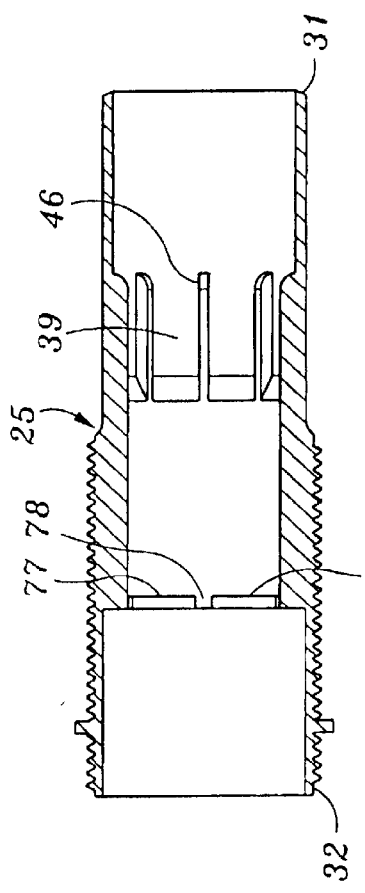
FIG. 3
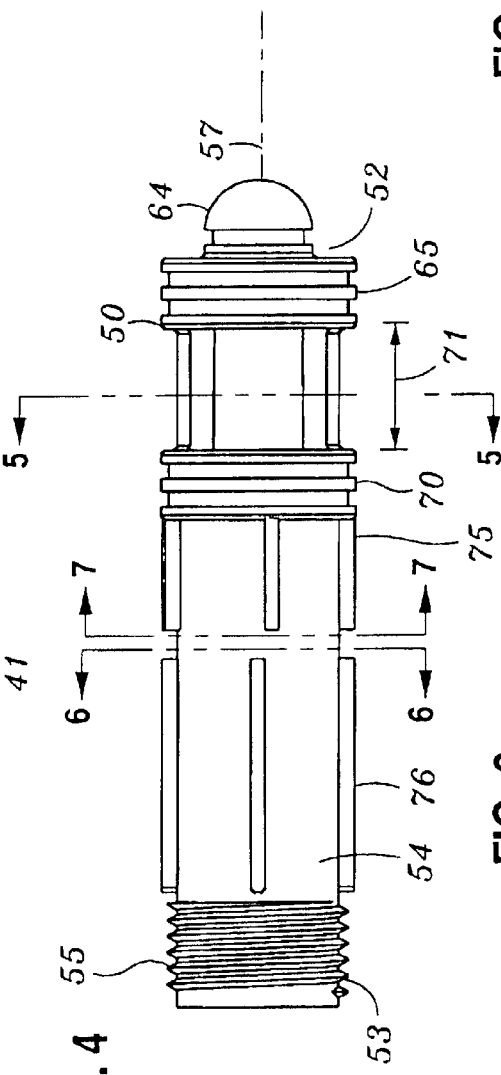
FIG. 4
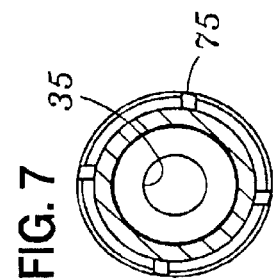
FIG. 7
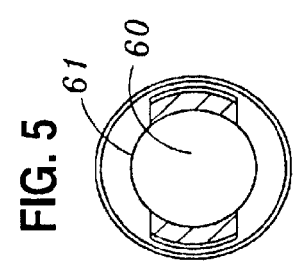
FIG. 6
FIG. 5

AXIALLY ACTUATED DRAIN VALVE FOR POOLS AND SPAS

FIELD OF THE INVENTION

An axially actuated drain valve for draining pools and spas which enables connection with a hose.

BACKGROUND OF THE INVENTION

Pools and spas of every kind require drainage of their water so the pool itself can be cleaned and supplied with fresh water. Every pool and spa incorporates some plumbing for this function.

Free standing pools and spas have special requirements that are not necessary for subgrade installations. Free standing installations are elevated where their sides are in plain sight. Conventional hardware in plain sight is neither attractive nor convenient, and can be run into. Also, especially in home installations, low cost, low maintenance, and high reliability are of great importance.

Especially in colder regions where freezing is a risk, although the entire tank of water may not freeze, local regions such as drain valves may indeed freeze and be damaged.

It is an object of this invention to provide a conveniently installed and conveniently used drain valve that can be molded from suitable resins which is unobtrusive in contour, comparatively inexpensive to manufacture, and which when closed provides no regions where water could be confined which could create a risk when frozen.

It is another object of this invention to provide a drain valve adapted conveniently to be engaged by a hose coupling for conveying away the drained water and which valve when closed and disconnected from the hose is recessed and mostly out of sight.

BRIEF DESCRIPTIONS OF THE INVENTION

A valve according to this invention has a central axis of actuation. It includes a body attachable to an opening in a vessel wall. It has a central passage with an inlet end which extends into the vessel, an outlet end facing outwardly from the vessel, and an internal bore extending from end to end.

The body includes a peripheral wall, an inlet port, an axially extending first peripheral sealing surface in communication with said inlet port, an axially extending second peripheral sealing surface in said passage spaced from said first peripheral sealing surface, and an axially extending relief located between said peripheral sealing surfaces.

A plunger has a central axis and is mounted coaxially in said passage for axial reciprocable movement therein. The plunger has an inner end and an outer end. Adjacent to its inner end the plunger has a first peripheral sliding seal. A second peripheral sliding seal also surrounds said plunger. Said sliding seals are adapted to make respective sliding sealing contacts with said first and second peripheral sealing surfaces in said passage, a central flow bore extending from said outer end into said plunger, and a side port extending laterally from the flow bore through said plunger, opening from said flow bore between said first and second sliding seals, and a hose coupler adjacent to said outer end.

According to a preferred but optional feature of the invention, the diameter of the inlet port is smaller than the diameter of the first peripheral sealing surface, and an end seal is formed on the said inner end to close the inlet port when the plunger is fully inserted in the passage.

The above and other features of this invention will be fully understood from the following detailed description and the accompanying drawings, in which:

BRIEF DESCRIPTION OF THE DRAWINGS

FIG. 3 is an axial cross-section of a portion of the valve of FIG. 1;

FIG. 4 is a side view of the plunger shown in FIG. 2; and

FIGS. 5, 6 and 7 are lateral cross-sections taken at lines 5—5, 6—6, and 7—7, respectively in FIG. 4.

DETAILED DESCRIPTION OF THE INVENTION

Figure 1:
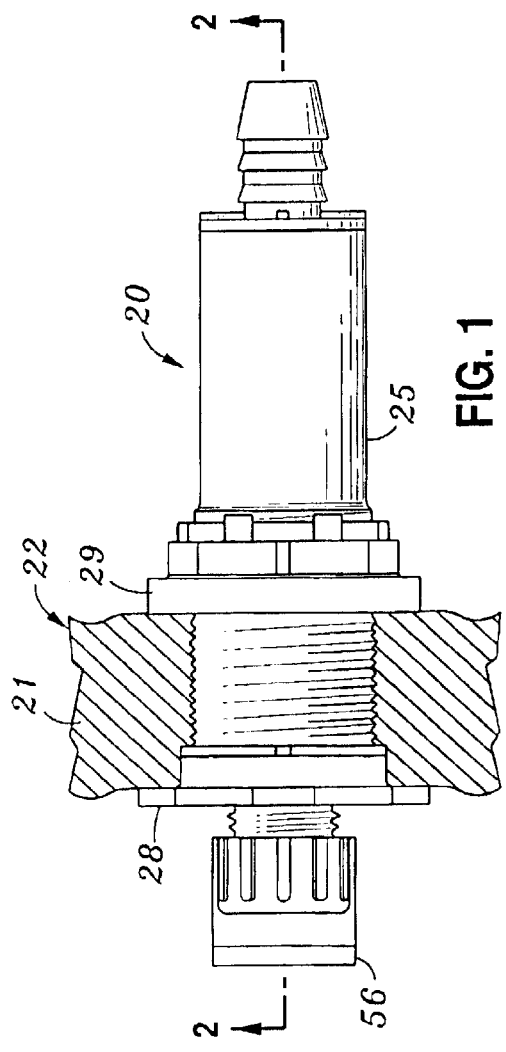
FIG. 1 is a side view of a valve according to the invention installed in the wall of a vessel.

A drain valve 20 according to this invention is shown installed in the wall 21 of a vessel 22. The term "vessel" as used herein is intended to include all such pools, spas, tanks, and ponds of the sort that are used for recreation purposes, and also to such structures as may be used for aquariums. The common feature of these applications is the need to remove and replace the water in them, and to clean its structure while empty. The most pertinent installations will be above grade, where any related plumbing will be visible.

Valve 20 includes a body 25 with an outer wall 26 that carries a thread 27 which receives a pair of collars 28, 29. These collars, when threaded onto the body will hold the body to the vessel wall. It is a desirable feature of the invention that the valve, when closed, need not project beyond the vessel wall. This product when installed is unobtrusive.

Valve body 25 has a central passage 30 which extends from its inner end 31 to its outer end 32. The passage has an internal peripheral wall. At its inner end it closes down to an inlet port 34. Inlet port 34 is bounded by a seat 35.

Passage 30 has a central axis 36. Adjacent to its inner end, the passage includes a first peripheral sealing surface 37. A second peripheral sealing surface 38 is spaced from the first peripheral sealing surface 37 by axially-extending peripheral recesses 39. These sealing surfaces are cylindrical and coaxial.

The reduced-dimension inlet port 34 is optional. If desired it can be eliminated, and the first peripheral sealing surface will define, at its inner end, the entry port to the valve.

First peripheral sealing surface 37 has a dimension of axial length, which will be discussed in further detail below. Similarly second peripheral sealing surface will have an axial length.

For molding convenience, the inlet port 34 and first peripheral sealing surface 37 are formed on a separate insert 44 that is pressed into the body.

It will be observed that the inside diameter of the first sealing surface 37 is the same as the diameter of the second peripheral sealing surface 38. There is a minor gap 45 of no significance between them.

Again for molding convenience, body 25 provides recesses 39 between axially-extending vanes 46. These recesses terminate between the two sealing surfaces.

Figure 2:
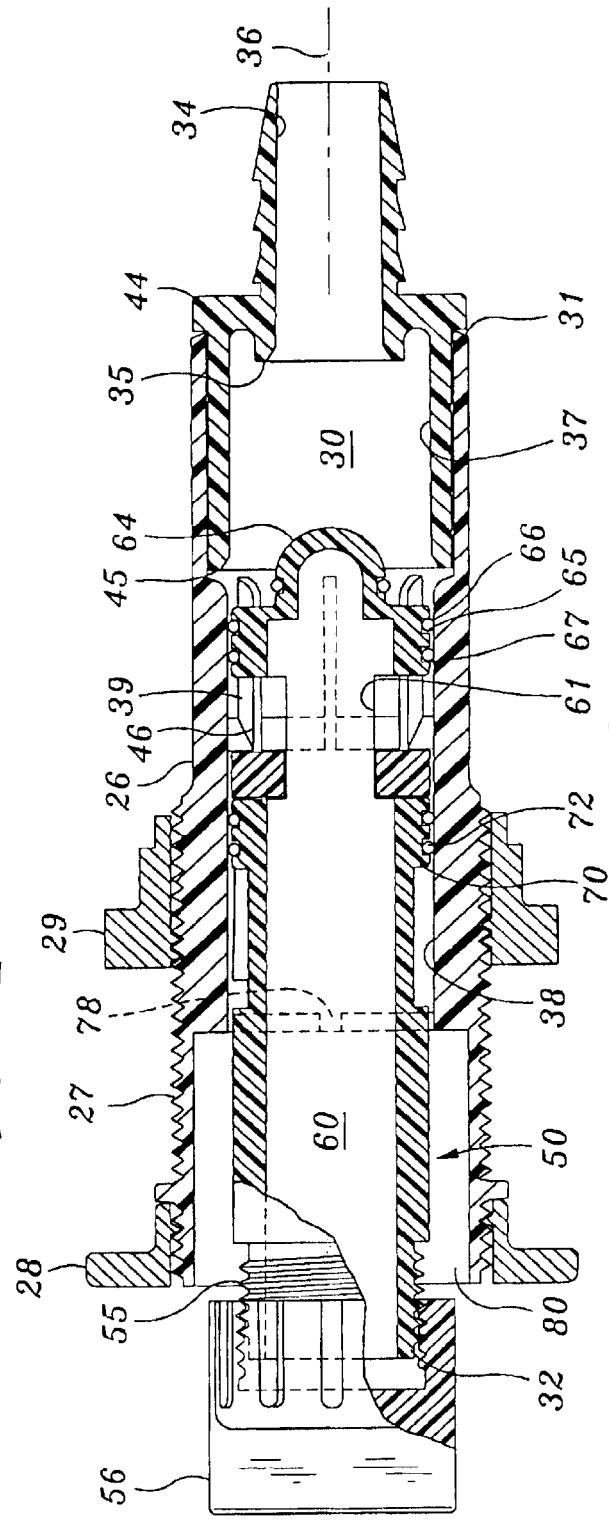
FIG. 2 is an axial cross-section of the valve of FIG. 2 in its open condition, taken at line 2—2 in FIG. 1.

A plunger 50 has a central axis 57. It is mounted coaxially in the body passage for axial reciprocation. When fully inserted to the right in FIG. 2, it will close the valve. In FIG. 2 the valve is shown in its fully open configuration. When sufficiently extended, the plunger will open the valve to drain the vessel. When closed, there will remain no region in the valve in which water would be confined so as to be locally frozen.

The plunger has an inner end 52 and an outer end 53. Its wall 54 carries a thread 55 which forms part of a hose coupling (not shown). It can also receive an internally threaded closure cap 56 if desired.

The plunger includes a flow bore 60 which extends into the plunger from its outer end toward its inner end, at which it is closed. A flow port 61 extends from the flow bore through the wall of the plunger to its outside surface.

When the reduced-dimension inlet port 34 is provided, the plunger will carry an inlet port closure 64. Preferably the closure will carry a sealing ring (not shown), but may instead be a simple tapered or rounded plug to close the inlet port when the plunger is fully inserted.

A first peripheral seal 65 is formed around the plunger near its inner end. Preferably it includes a pair of ring seals 66, 67 (see FIG. 2) which make a sliding fluid sealing fit in the first peripheral sealing surface 37. Here it will be observed that, so long as seal 65 remains in sealing surface 37, the valve will be closed. When the reduced area inlet port is used, it will provide a secondary seal against leakage. If it is not provided, then surface 37 and seal 65 act as an inlet port closure.

Notice particularly that the plunger can move from fully closed to fully open by axially moving past sealing surface 37 to permit flow through recesses 39. This is an important function, because it enables the plunger to be pulled out by a useful distance without opening the valve. This exposes thread 55 so that after removing cap 56, a hose coupling can be threaded onto the plunger while the valve still remains closed.

A second peripheral sliding seal 70 is formed on the plunger, spaced from the first by an axial spacing 71. Sealing rings 72 slide along and seal with the second peripheral sealing surface. Flow port 61 opens through the wall of the plunger between sliding seals 65 and 70. Flow port 61 will always face into recess 39.

It is necessary that the plunger be axially reciprocable so the valve can be opened and closed. It is desirable, although not necessary, for the plunger to be restrained against excessive rotation so a hose coupling can more readily be threaded onto it. If not so provided, the valve will still function and can be coupled, but then the user would have to hold the plunger against rotation, which he could do.

To facilitate this function, two sets of splines 75, 76 are formed, with the sets angularly disposed relative to one another. Their function is to react with a notched stop 77 with an equal number of equally spaced notches 78. This stop extends into the passage, and will stop the plunger from moving excessively toward the outer end of the passage unless the splines pass through a notch. Also it will always block sliding seal 70 to prevent the expulsion of the plunger from the outside end. Accordingly, the valve must be assembled from its inner end.

When the plunger is in its outer position, splines 75 will be engaged in the notches, and splines 76 are angularly placed so they will engage the stop. The plunger will be restrained against rotation. Instead of the illustrated cap (which will close the valve in all plunger positions, a hose coupling (not shown) may be threaded on to the plunger instead.

It will be observed that the body forms a receptacle cavity 80 which will receive the cap when the valve is closed, so that it will not protrude beyond the vessel wall.

The operation of this drain valve will be evident from the foregoing. With the plunger fully inserted, the valve is closed, and the threads remain inside body cavity 80. In order to attach a hose, the plunger is pulled partway out, so that the first sliding seal remains engaged to the first peripheral sealing surface 37.

Then the valve will be opened by pulling the plunger farther out. At this time the first sliding seal clears the first sealing surface, so that the inlet port is open and water can flow into recesses 39, and from the recesses into the flow port and out the flow bore.

At this time the second sliding seal will have engaged the second sealing surface to prevent leakage pass the plunger. The outward movement of the plunger will be stopped when the stop surface 41 is engaged by the plunger.

Closure of the valve will be accomplished by moving the plunger into the body. When the first sliding seal again engages the first sealing surface, the hose can be disconnected, and the plunger then shoved all the way in. The hydraulic pressure involved is so small that the friction forces in the valve will suffice to hold the valve closed, especially when the smaller inlet port is used. However, with a cap on the plunger, the valve will not leak even if the plunger is fully out.

It will be observed that the regions on the outside of the plunger vented to atmospheric are fully drained. Similarly, with the valve closed and before the cap is applied, the inside of the plunger will be fully drained. There is no "loose" water to be frozen.

This valve is readily produced by injection molding processes, and requires only the application of ring seals for completion. It is inexpensive, unobtrusive, and reliable.

This invention is not to be limited by the embodiment shown in the drawings and described in the description, which is given by way of example and not of limitation, but only in accordance with the scope of the appended claims.

What is claimed is:

1. A drain valve for placement in the wall of a vessel to drain its contents, said valve comprising:

a body having an inner end, an outer end, a central axis, an outer wall, an inner peripheral wall defining a central passage which extends from end to end of the body, an inlet port adjacent to said inner end, a first and a second peripheral sealing surface on said inner peripheral wall, said sealing surfaces being spaced apart by a recess between them, and a thread on said body adjacent to its outer end to receive a collar for mounting the body in an opening through the wall of the vessel;

a plunger in said passage, extending axially and slidably fitted therein, said plunger having a central axis coaxial with the axis of said passage, a first peripheral sliding seal so disposed and arranged as to make a fluid sealing fit with said first peripheral sealing surface over a range of its movement to close the valve to flow, and to pass beyond it to permit said flow, a second peripheral seal so disposed and arranged as to seal with said second peripheral sealing surface, a flow bore in said plunger extending from its outer end to a flow port opening onto the outside of the plunger between said sliding seals;

whereby with the valve mounted to the vessel and the plunger pressed inwardly so the first sliding seal and first peripheral sealing surface engage, there is no flow through the valve, but when the plunger is moved outwardly so the first sliding seal moves away from said first peripheral sealing surface, water can flow to the recess and into said flow port and out of the plunger.

2. A drain valve according to claim 1 in which a thread is formed on said plunger adjacent to said outer end of said body, whereby to expose said thread to a coupling when the plunger is axially moved toward said outer end.

3. A drain valve according to claim 1 in which an inlet port is formed in said body at its inner end.

4. A drain valve according to claim 3 in which said inlet port has a lateral dimension smaller than said first peripheral sealing surface, and said plunger carries a seal to close the said inlet port when fully moved toward said inner end.

5. A drain valve according to claim 1 in which said plunger includes an axially extending spline and said body carries a notched stop whereby to permit axial reciprocation of said plunger, but limits its rotation in said body.

6. A drain valve according to claim 5 in which said spline is provided in two segments, each segment being angularly spaced from the other with a gap between them such as to permit axial reciprocation of one, but to prevent the other, without interim rotation of the plunger.

7. A drain valve according to claim 2 in which an inlet port is formed in said body at its inner end.

8. A drain valve according to claim 2 in which said inlet port has a lateral dimension smaller than said first peripheral sealing surface, and said plunger carries a seal to close the said inlet port when fully moved toward said inner end.

9. A drain valve according to claim 8 in which said plunger includes an axially extending spline and said body carries a notched stop whereby to permit axial reciprocation of said plunger, but limits its rotation in said body.

* * * * *